(12) United States Patent
Francis

(10) Patent No.: US 9,916,025 B2
(45) Date of Patent: *Mar. 13, 2018

(54) PERFORMING SEARCHES USING COMPUTING DEVICES EQUIPPED WITH PRESSURE-SENSITIVE DISPLAYS

(71) Applicant: Samsung Electronics Co., Ltd., Suwon-si, Gyeonggi-do (KR)

(72) Inventor: Thomas Francis, Dubuque, IA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,499

(22) Filed: Dec. 15, 2015

(65) Prior Publication Data
US 2017/0068749 A1    Mar. 9, 2017

Related U.S. Application Data

(60) Provisional application No. 62/215,492, filed on Sep. 8, 2015.

(51) Int. Cl.
*G06F 15/00* (2006.01)
*G06F 3/041* (2006.01)
*H04L 12/58* (2006.01)
*G06F 3/044* (2006.01)
*G06F 17/30* (2006.01)
*G06F 3/01* (2006.01)

(52) U.S. Cl.
CPC ............ *G06F 3/0414* (2013.01); *G06F 3/016* (2013.01); *G06F 3/044* (2013.01);
(Continued)

(58) Field of Classification Search
CPC ............................... H04L 12/58; G06F 3/0484
(Continued)

(56) References Cited

U.S. PATENT DOCUMENTS

| 8,209,628 B1* | 6/2012 | Davidson | ............. G06F 3/0487 715/790 |
| 2008/0294436 A1* | 11/2008 | Andreasson | ........... G06Q 30/02 704/251 |

(Continued)

OTHER PUBLICATIONS

How Apple's Force Touch could change the way you use your next iPhone or iPad; cnet.com; Aug. 17, 2015.
(Continued)

*Primary Examiner* — Kevin Nguyen
(74) *Attorney, Agent, or Firm* — Jefferson IP Law, LLP

(57) ABSTRACT

Techniques include receiving a pressure input from a user of a user device at a pressure-sensitive display of the device and determining that the display is covered (e.g., obscured from the user's view) using the device. The techniques further include, in response to receiving the pressure input and determining that the display is covered, receiving a search query from the user at the device via voice input, transmitting the query to a search system via a network using the device, and receiving search results from the system at the device subsequent to transmitting the query. The techniques also include performing one or more actions associated with the search results using the user device (e.g., displaying the results to the user at the display, providing a text-to-speech or playback output for the results to the user, and/or forwarding the results to another computing device for display and/or text-to-speech or playback output).

20 Claims, 9 Drawing Sheets

(52) U.S. Cl.
CPC .... *G06F 17/3056* (2013.01); *G06F 17/30401* (2013.01); *G06F 17/30477* (2013.01); *G06F 17/30554* (2013.01); *G06F 17/30761* (2013.01); *G06F 17/30769* (2013.01); *G06F 17/30976* (2013.01); *H04L 51/046* (2013.01)

(58) Field of Classification Search
USPC .................. 715/763–765, 851–853, 773–775
See application file for complete search history.

(56) References Cited

U.S. PATENT DOCUMENTS

2015/0242422 A1* 8/2015 Shapira .............. G06Q 30/0282
707/722

2015/0317320 A1* 11/2015 Miller ................. G06F 17/3064
707/728
2016/0191446 A1* 6/2016 Grol-Prokopczyk
.......................... G06F 3/04817
709/206

OTHER PUBLICATIONS

Apple Pegged to Bring Force Touch Pressure-Sensitive Input to Next iPhones; techcrunch.com; Mar. 11, 2015.
Is Apple Watch's Pressure-Sensitive Screen a Bigger Deal Than the Gadget Itself?; wired.com; Sep. 15, 2014.
U.S. Appl. No. 14/970,492, filed Dec. 15, 2015, Thomas Francis.
U.S. Appl. No. 15/245,761, filed Aug. 24, 2016, Thomas Francis.

* cited by examiner

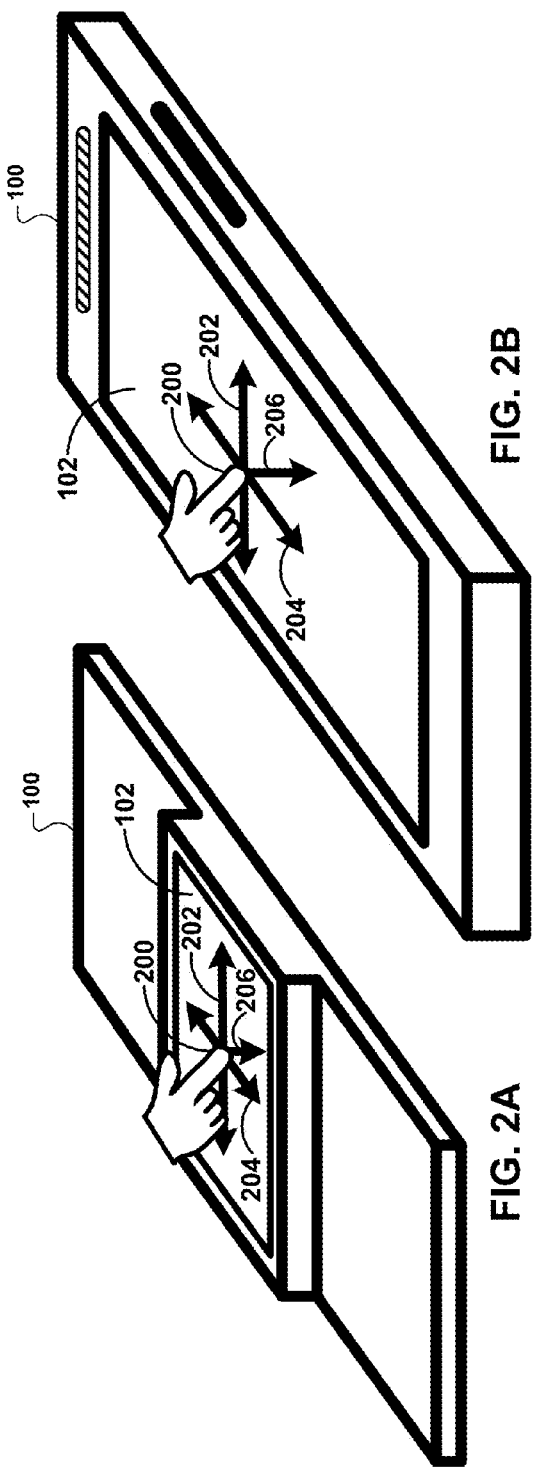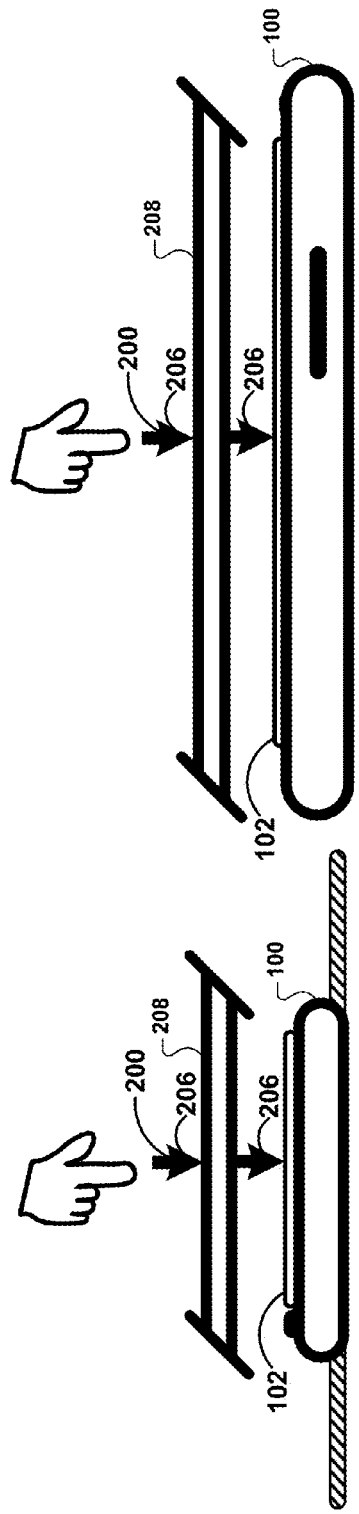

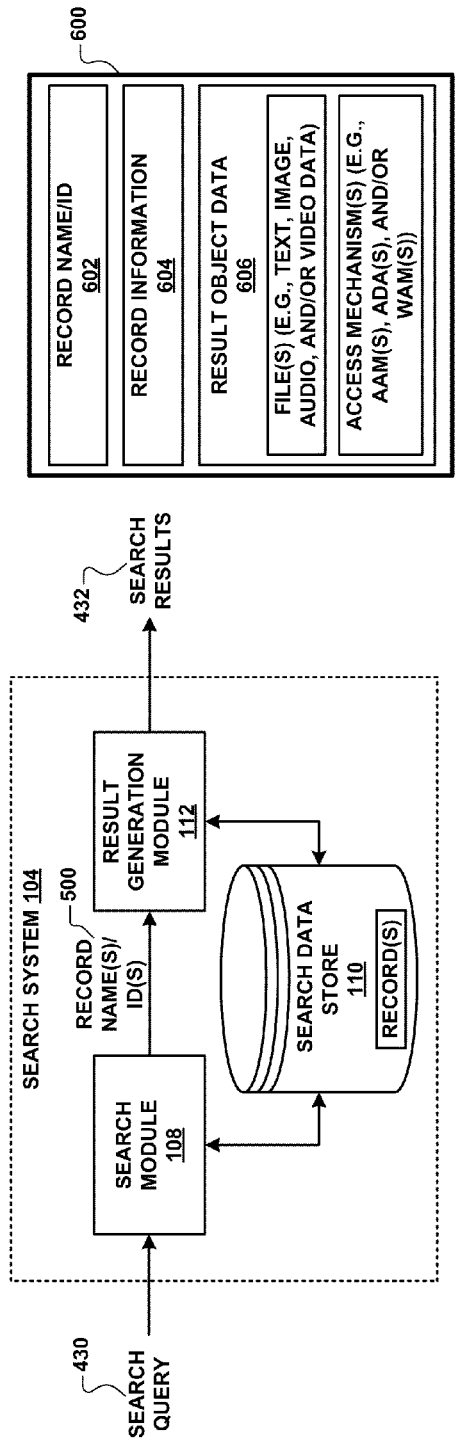
FIG. 5A
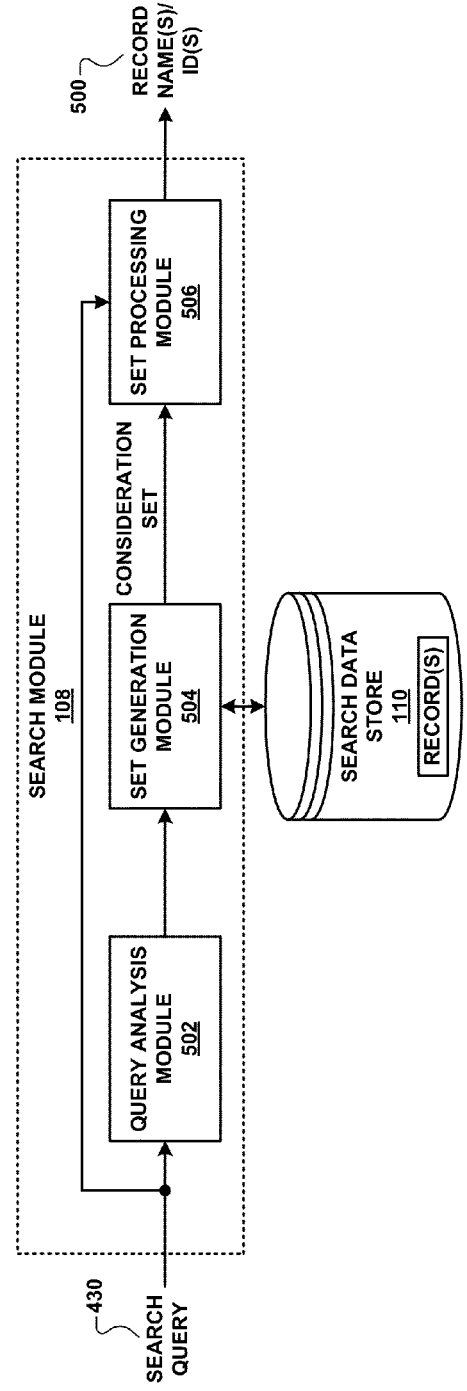
FIG. 5B
FIG. 6

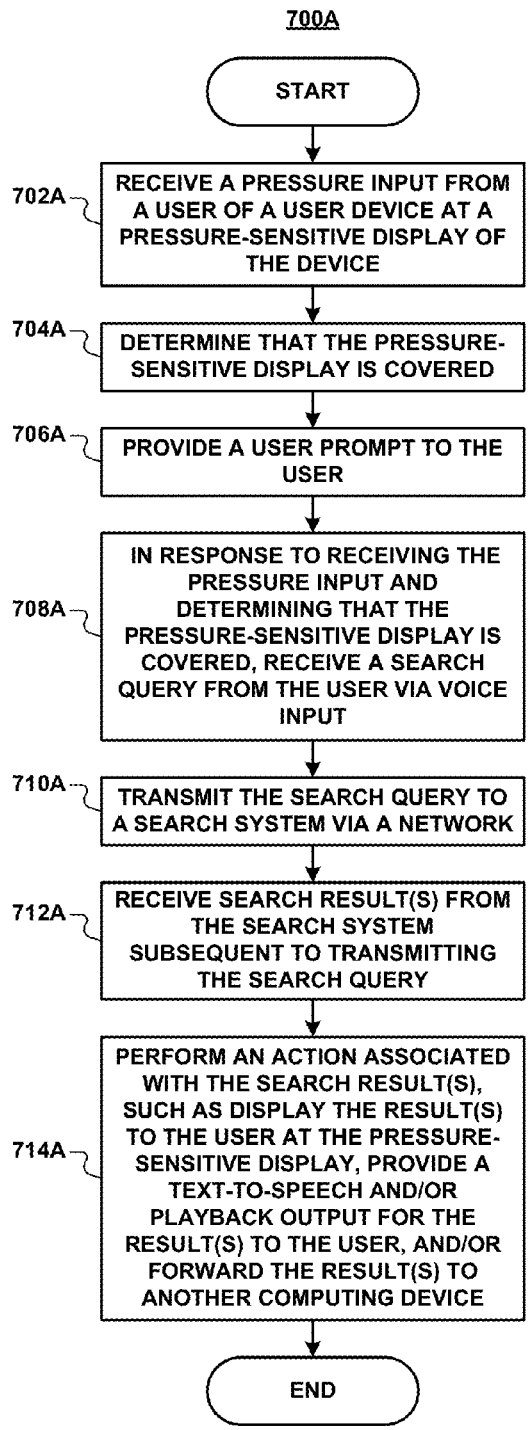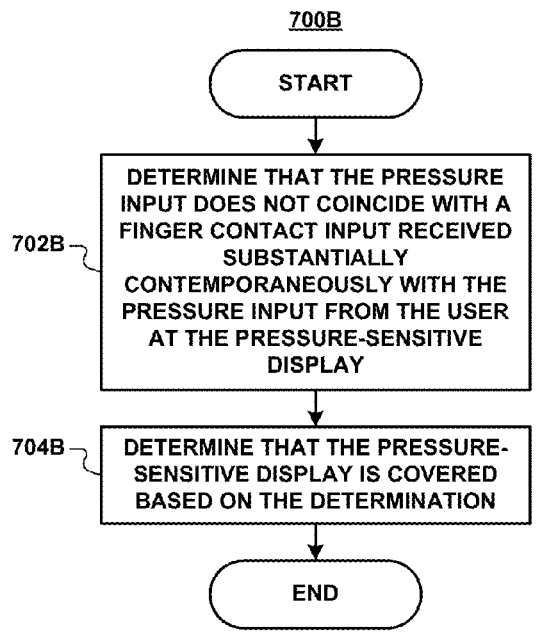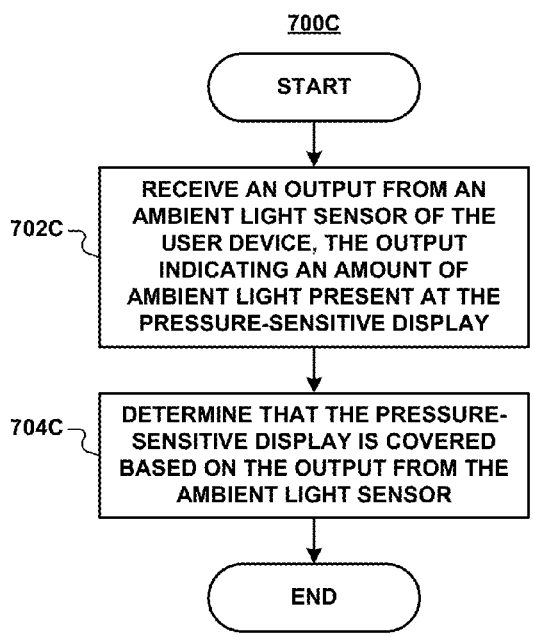
FIG. 7A
FIG. 7B
FIG. 7C

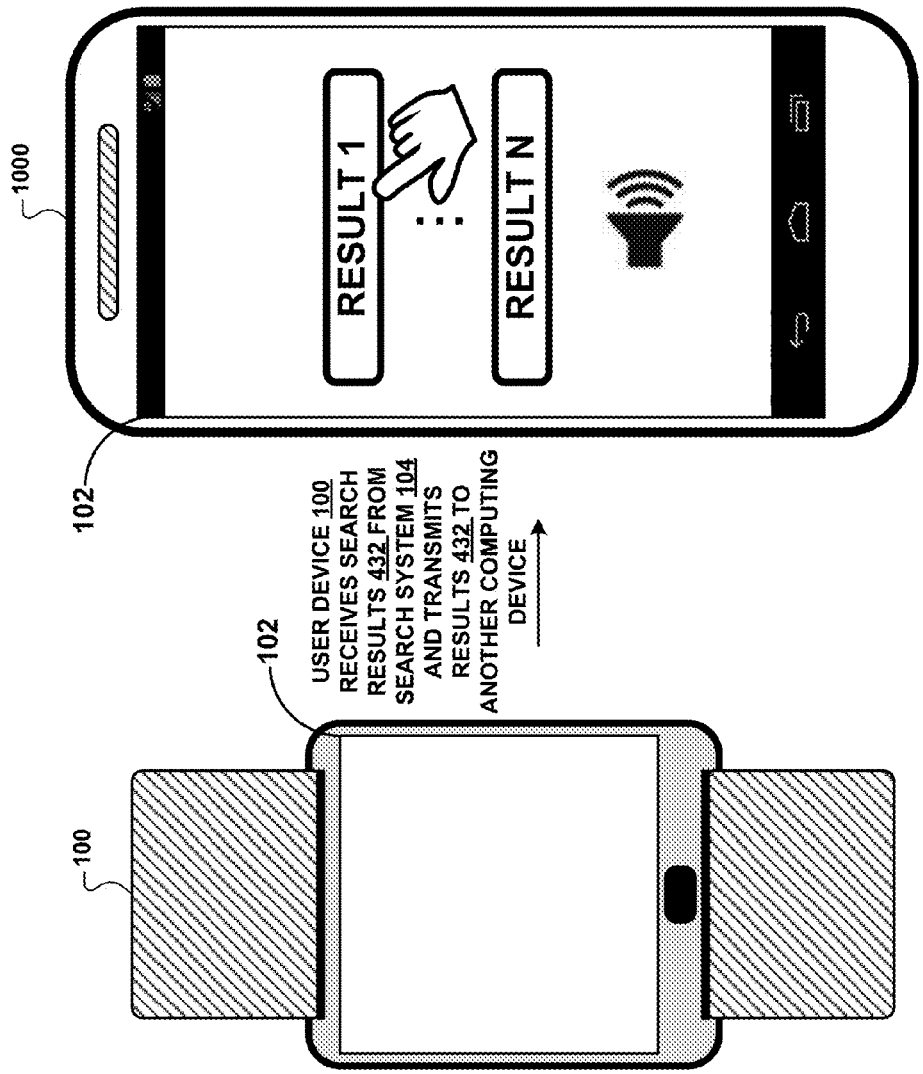

PERFORMING SEARCHES USING COMPUTING DEVICES EQUIPPED WITH PRESSURE-SENSITIVE DISPLAYS

CROSS-REFERENCE TO RELATED APPLICATION

This application claims the benefit of U.S. Provisional Application No. 62/215,492 filed Sep. 8, 2015, which is hereby incorporated by reference in its entirety.

TECHNICAL FIELD

This disclosure generally relates to the field of computing devices, and more particularly to techniques for interacting with touchscreen-enabled computing devices.

BACKGROUND

In recent years, the use of computers, tablets, smartphones, smart watches, and other stationary and mobile computing devices has grown significantly. Additionally, the inclusion of various touchscreen technologies configured to receive user inputs at display screens of these and other computing devices has also increased. Today, many consumer and industrial computing devices and appliances are capable of receiving user inputs at display screens via any of a variety of different touchscreen technologies, including resistive, capacitive, surface-acoustic-wave (SAW), optical, acoustic, as well as any other touchscreen technologies or types.

SUMMARY

In one example, a computing device includes a pressure-sensitive display configured to receive a pressure input from a user of the device, a voice input module configured to receive a search query from the user via voice input, a network interface component configured to communicate with a network, one or more memory components configured to store computer-readable instructions, and one or more processing units configured to execute the instructions. The computer-readable instructions, when executed by the processing units, cause the units to receive the pressure input from the user at the pressure-sensitive display, determine that the display is covered, and, in response to receiving the input and determining that the display is covered, receive the search query from the user using the voice input module. The computer-readable instructions further cause the processing units to transmit the search query to a search system via the network using the network interface component, receive search results from the system subsequent to transmitting the query, and perform an action associated with the results.

In another example, a method includes receiving a pressure input from a user of a user device at a pressure-sensitive display of the device, determining that the display is covered using the device, and, in response to receiving the input and determining that the display is covered, receiving a search query from the user at the device via voice input. The method further includes transmitting the search query to a search system via a network using the user device, receiving search results from the system at the device subsequent to transmitting the query, and performing an action associated with the results using the device.

BRIEF DESCRIPTION OF DRAWINGS

The details of one or more examples are set forth in the accompanying drawings and the description below. Other features, objects, and advantages will be apparent from the description and drawings, and from the claims.

FIGS. 2A-2D are conceptual diagrams of example user interactions with displays of user devices, consistent with the techniques of this disclosure.

FIG. 5A is a functional block diagram of an example search system.

FIG. 5B is a functional block diagram of an example search module.

FIG. 6 illustrates an example record included in an example search data store.

FIGS. 7A-7C are flow diagrams that illustrate example methods for performing a search using a user device in response to receiving a pressure input at a pressure-sensitive display of the device and determining that the display is covered.

FIGS. 9A-10B illustrate example graphical user interfaces (GUIs) that may be generated on a user device according to this disclosure.

DETAILED DESCRIPTION

Figure 1B:
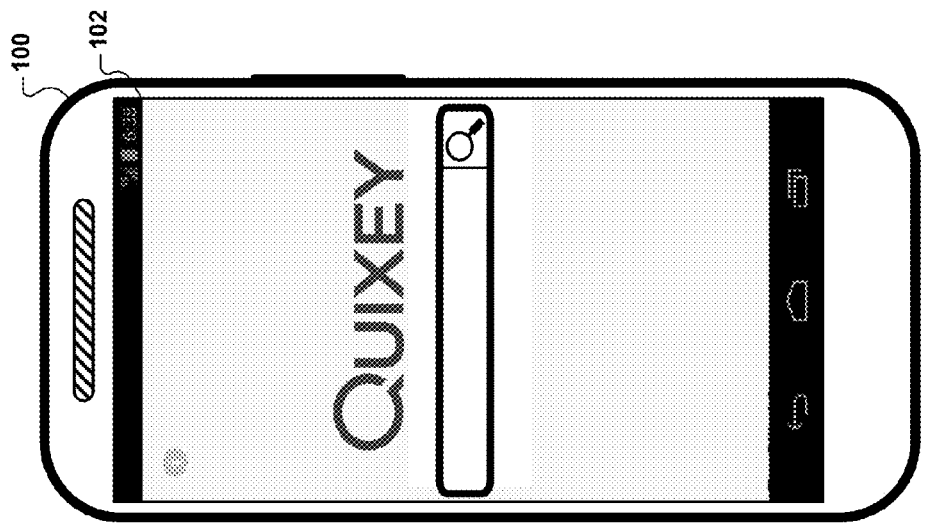
FIGS. 1A-1B illustrate example user devices that may be used to implement the techniques of the present disclosure.

The figures and the following description relate to example implementations by way of illustration only. It should be noted that from the following discussion, alternative implementations of the structures and methods disclosed herein will be readily recognized as viable alternatives that may be employed without departing from the scope of this disclosure.

The present disclosure generally relates to the field of computing devices, and, more particularly, to techniques for interacting with computing devices equipped with pressure-sensitive displays (e.g., laptops, tablets, smartphones, smart watches, and fitness bands). Specifically, the techniques of this disclosure are directed to computing devices configured to receive inputs from users via pressure-sensitive displays capable of detecting (e.g., sensing) pressure inputs from the users. For example, to receive the pressure inputs, the pressure-sensitive displays may each include one or more of a resistive touchscreen, a push-button-based touchscreen, and another pressure-sensitive sensor or input device. In some examples, the pressure-sensitive displays described herein may also be configured to detect (e.g., sense) other types of inputs from the users, such as finger contact inputs. For instance, to receive the finger contact inputs from the users, the pressure-sensitive displays may each include one or more of a capacitive touchscreen and another finger contact-sensitive sensor or input device.

In general, the techniques described herein may enable users to interact with computing devices that include pressure-sensitive displays in instances where the displays are covered (e.g., obscured from the users' view by one or more layers of clothing or other objects). In particular, the techniques may include receiving a pressure input from a user at a pressure-sensitive display of a user device. The techniques may further include determining that the pressure-sensitive display is covered. For example, determining that the pressure-sensitive display is covered may be performed using the received pressure input and/or other information (e.g., an output of an ambient light sensor included in the user device). In this disclosure, receiving the pressure input and determining that the pressure-sensitive display is covered may be referred to as detecting a "covered user interaction." The techniques may also include, in response to receiving the pressure input and determining that the pressure-sensitive display is covered (e.g., in response to detecting a covered user interaction), performing any of a variety of actions using the user device, as described herein. Using the described techniques may, in some examples, improve the user's experience when interacting with the user device.

As one example, the pressure-sensitive display of the user device may be covered by the user's clothing (e.g., by sleeve or pocket fabric) or other objects, thereby preventing the user from interacting with the display. For example, the pressure-sensitive display being covered may prevent the user from entering search queries into a search application (app) executing on the user device (e.g., using a capacitive touchscreen included in the display, or a keypad included in the device) and performing searches using the device. In this example, in response to receiving the pressure input and determining that the pressure-sensitive display is covered, as described herein, the user device may further receive, via voice input, a search query from the user. For example, the user device may first provide a user prompt (e.g., a sound and/or vibration output) to the user requesting that the user provide the search query and subsequently receive the query from the user in response to providing the prompt. In this example, the user device may then transmit the search query to a search system, receive search results from the system in response to transmitting the query, and perform one or more actions associated with the results. As one example, the user device may display the search results to the user at the pressure-sensitive display (e.g., assuming that the display is no longer covered). As another example, the user device may provide a text-to-speech or playback output for the search results (e.g., for text-based search results and/or search results including an audio component) to the user. As still another example, the user device may forward the search results to another computing device (e.g., for display and/or text-to-speech or playback output).

In this manner, the techniques described herein may improve a user's experience when using a user device that includes a covered pressure-sensitive display by avoiding the inconvenience associated with the user uncovering the display in order to interact with the device. For example, as described herein, the techniques may enable the user to specify search queries using voice input and perform searches using the queries and the user device, despite the pressure-sensitive display being covered, or otherwise obscured from the user's view.

Figure 1A:
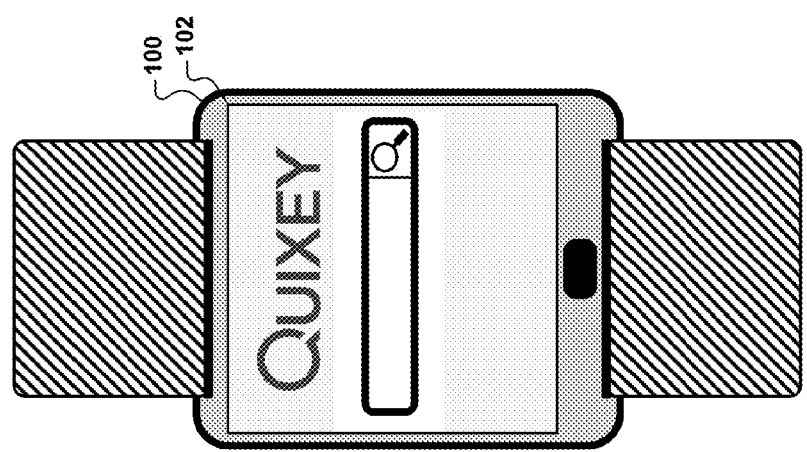

FIGS. 1A-1B illustrate example user devices 100 that may be used to implement the techniques of this disclosure. As shown in FIG. 1A, the user device 100 may be a smart watch computing device configured to be worn around a user's wrist and capable of being covered by the user's shirt sleeve. Alternatively, as shown in FIG. 1B, the user device 100 may be a smartphone computing device configured to be held in a user's hand and capable of being stored in the user's pocket. In other examples, the user device 100 may be a tablet, a laptop computer, or a desktop computer. In still other examples, the user device 100 may be a computing device having another form factor, such as a computing device included in a vehicle, a gaming device, a television, or another appliance (e.g., a networked home automation device or appliance). In general, the user device 100 of this disclosure may be any computing device that includes a pressure-sensitive display 102 configured to receive pressure inputs (e.g., a display that includes a resistive or push-button-based touchscreen) from users of the device 100, as described herein. In other words, the pressure-sensitive display 102 may be configured to receive pressure inputs having any non-zero amount of pressure, or force per unit of area, from the users using any of one or more fingers of the users' hands, other parts of the users' bodies, and other objects that are not part of the users' bodies (e.g., styli), irrespective of whether the body part or object used is electrically conductive. Additionally, or alternatively, the pressure-sensitive display 102 may be configured to receive the pressure inputs from the users via an accelerometer sensor included in the user device 100 that detects force (e.g., in the form of so-called finger "taps," or shaking) applied to the display 102 using fingers of the users' hands, other parts of the users' bodies, and/or other objects that are not part of the users' bodies, also irrespective of the body part or object used being electrically conductive. In other words, the accelerometer sensor may provide an output that indicates a pressure input received at the pressure-sensitive display 102. In further examples, as described herein, the pressure-sensitive display 102 may also be configured to receive finger contact inputs (e.g., the display 102 may include a capacitive touchscreen configured to detect user finger contact, such as finger taps and so-called finger "swipes"). For example, the pressure-sensitive display 102 may be configured to receive finger contact inputs, which may or may not include a pressure or force component, from the users using any of fingers of the users' hands, other parts of the users' bodies (e.g., portions of the users' palms), and other objects that are not part of the users' bodies (e.g., conductive styli), so long as the body parts or objects used are substantially electrically conductive.

The user device 100 may use various different operating systems or platforms. In examples where the user device 100 is a mobile device (e.g., a smart watch or a smartphone), the device 100 may operate using an operating system (OS) such as ANDROID® by Google Inc., IOS® by Apple Inc., or WINDOWS PHONE® by Microsoft Corporation. In examples where the user device 100 is a laptop or desktop computer, the device 100 may use an OS such as MICROSOFT WINDOWS® by Microsoft Corporation, MAC OS® by Apple Inc., or LINUX® (LINUX is the registered trademark of Linus Torvalds in the U.S. and other countries). The user device 100 may also interact with users and/or other devices or systems using operating systems other than those described herein, whether presently available or developed in the future.

FIGS. 2A-2D are conceptual diagrams of example user interactions with pressure-sensitive displays 102 of user devices 100, consistent with the techniques of this disclosure. The user device 100 depicted in FIG. 2A is a smart watch computing device. The user device 100 of FIG. 2A includes a pressure-sensitive display 102 capable of receiving pressure inputs 206 from users of the device 100. In particular, as shown in FIG. 2A, the pressure-sensitive display 102 may be configured to detect (e.g., sense) a pressing motion of one or more of a user's fingers, another part of the user's body, or an object that is not part of the user's body with respect to the display 102. For instance, the pressing motion may be in a direction that is substantially inward with respect to the pressure-sensitive display 102 and the user device 100 (e.g., substantially into a plane of the display 102 and in a direction that is substantially orthogonal to the plane). In other words, the pressing motion may be substantially within a Z-axis relative to an X-Y plane defined by the surface of the display 102 and directed substantially toward the display 102.

In some examples, the pressure-sensitive display 102 may be configured to detect a momentary pressing motion, or a push, lasting a relatively short time. In other examples, the pressure-sensitive display 102 may be configured to detect pressing motions lasting a specified duration of time (e.g., to filter out errant or inadvertent presses on, or so-called "bumps" against, the user device 100). In further examples, the pressure-sensitive display 102 may be configured to detect the pressing motion irrespective of the amount of pressure used. In other examples, the pressure-sensitive display 102 may be configured to detect pressing motions having at least a specified threshold amount of pressure (e.g., to filter out errant/inadvertent presses/bumps).

The pressure-sensitive display 102 of the user device 100 shown in FIG. 2A is also capable of receiving finger contact inputs 202 and 204 from the users of the device 100. Specifically, as shown in FIG. 2A, the pressure-sensitive display 102 may be further configured to detect (e.g., sense) a tapping and/or lateral swiping motion of one or more of the user's fingers, another part of the user's body, or a substantially electrically conductive object that is not part of the user's body with respect to the display 102. As one example, the tapping motion may be in a direction that is substantially inward with respect to the pressure-sensitive display 102 and the user device 100, in a similar manner as described with reference to the pressure input 206. In this example, the tapping motion may result in a finger contact with the pressure-sensitive display 102 in a particular area of the display 102 (e.g., at a given point within an X-Y plane defined by the surface of the display 102). For example, the finger contact may provide a small amount of pressure, or provide substantially no pressure, toward the pressure-sensitive display 102. The taping motion may be represented as a single point of finger contact with the pressure-sensitive display 102 (e.g., at an intersection of X- and Y-components 202, 204 described herein), as shown in FIG. 2A. As another example, the lateral swiping motion may be in one or more directions that are each substantially parallel with respect to the pressure-sensitive display 102 and the user device 100 (e.g., substantially parallel to the X-Y plane defined by the surface of the display 102). For example, the lateral swiping motion may be in any direction within the X-Y plane. For instance, the lateral swiping motion may be represented as a motion vector including a combination of an X-component 202 of the motion in the X (e.g., upward/downward) direction and a Y-component 204 of the motion in the Y (e.g., right/left) direction, as also shown in FIG. 2A. In this example, the lateral swiping motion may result in a finger contact with the pressure-sensitive display 102 along a range of distance spanning the display 102, e.g., again without providing a significant amount of pressure, or providing substantially no pressure, toward the display 102. The user device 100 depicted in FIG. 2B is a smartphone computing device and includes the same or similar elements and user interactions as those described with reference to the user device 100 shown in FIG. 2A.

In the examples described herein, the pressure-sensitive display 102 of the user device 100 may be configured to receive any combination of the pressure inputs 206 and finger contact inputs 202, 204 from the users of the device 100 (e.g., as depicted by a so-called "cumulative user input" 200 shown in FIGS. 2A-2D). In some examples, the pressure-sensitive display 102 may receive a pressure input 206 from a user of the user device 100 without also receiving a finger contact input 202, 204 from the user. In these examples, the user device 100 may determine that the pressure-sensitive display 102 is covered (e.g., obscured from the user's view by clothing or another object) by determining that the pressure input 206 does not coincide with any finger contact inputs 202, 204 also received (e.g., substantially contemporaneously with the pressure input 206) from the user at the same display 102. Additionally, or alternatively, the user device 100 may determine that the pressure-sensitive display 102 is covered based on an output received from an ambient light sensor included in the device 100.

FIGS. 2C and 2D illustrate side-views of the user devices 100 described with reference to FIGS. 2A and 2B. As shown in each of FIGS. 2C and 2D, the pressure-sensitive display 102 of the user device 100 receives a pressure input 206 from a user of the device 100. In each of the examples of FIGS. 2C and 2D, the pressure-sensitive display 102 is covered (e.g., obscured from the user's view) by one or more layers of clothing or another object, which may be referred to herein as an obstruction 208. As further shown in each example, the pressure-sensitive display 102 receives the pressure input 206 from the user through the obstruction 208. In other words, the pressure input 206 passes (e.g., is relayed as a mechanical force) from one or more of the user's fingers, another part of the user's body, or an object that is not part of the user's body through the obstruction 208 and reaches the pressure-sensitive display 102. In these examples, although the obstruction 208 may provide some amount of electrical insulation between the user's body part or object used to generate the pressure input 206 and the pressure-sensitive display 102, the display 102 may receive the input 206 from the user irrespective of whether the body part or object used is electrically conductive.

In contrast, as also shown in each of FIGS. 2C and 2D, the pressure-sensitive display 102 does not receive a finger contact input 202, 206 from the user. Stated another way, in instances where the pressure input 206 described herein originates from one or more of the user's fingers, another part of the user's body, or a conductive object that is not part of the user's body, the pressure-sensitive display 102 does not receive a corresponding finger contact input 202, 204 from the user due to the obstruction 208. In these examples, because the obstruction 208 may provide some amount of electrical insulation between the user's body part or object used to generate the finger contact input 202, 204 and the pressure-sensitive display 102, the display 102 may not receive (e.g., the obstruction 208 may block) the input 202, 204, even though the body part or object used is electrically conductive.

Figure 3:
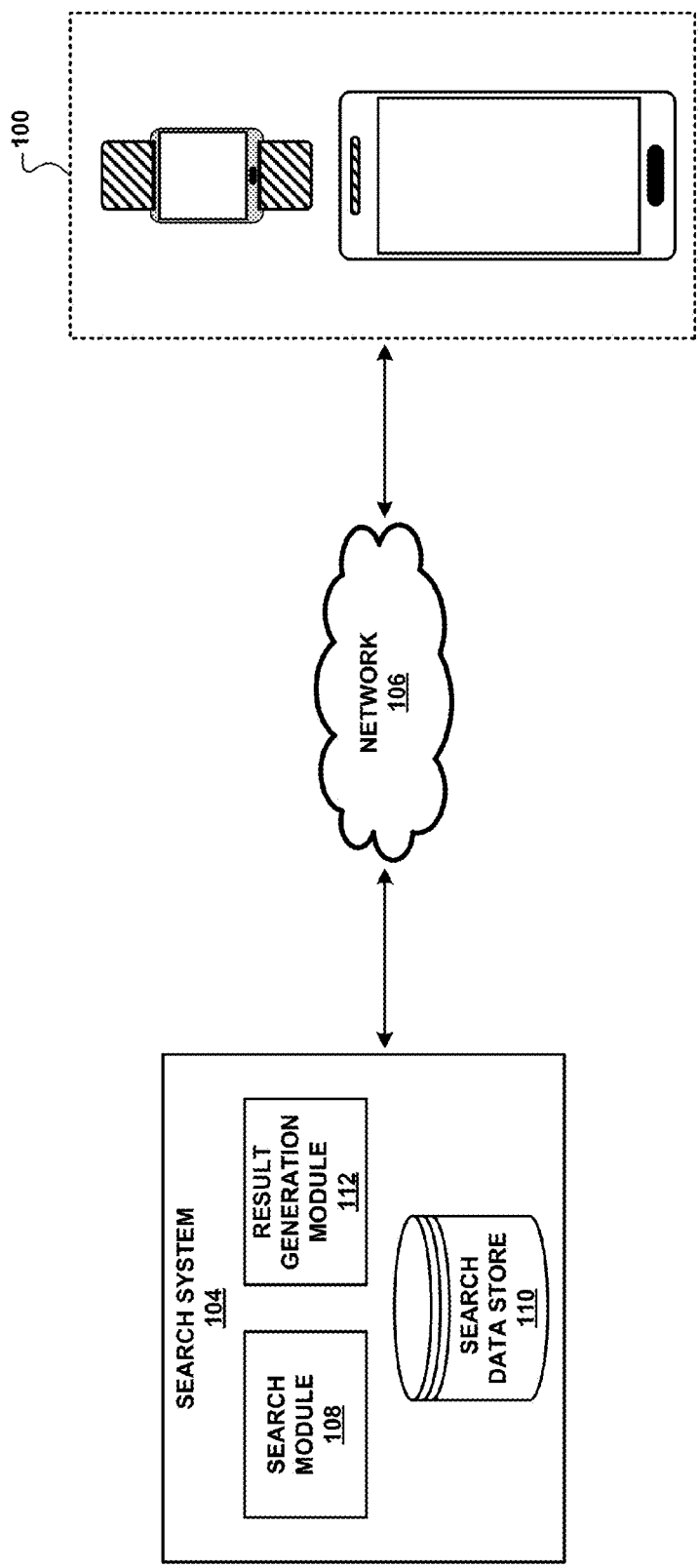
FIG. 3 illustrates an example environment that includes a user device and a search system that communicate via a network.

FIG. 3 is a functional block diagram illustrating an example environment that includes a user device 100 and a search system 104 that communicate via a network 106. The network 106 through which the user device 100 and the search system 104 communicate may include any type of network, such as a local area network (LAN), a wide area network (WAN), and/or the Internet. As shown in FIG. 3, the search system 104 includes a search module 108, a search data store 110, and a result generation module 112, which are described herein.

In the example of FIG. 3, the user device 100 initially receives a pressure input 206 from a user of the device 100 at a pressure-sensitive display 102 of the device 100 and determines that the display 102 is covered, as described herein. In some examples, the user device 100 may subsequently provide a user prompt to the user configured to prompt the user to provide a search query to the device 100 via voice input. In this example, the user device 100 receives the search query from the user via voice input (e.g., in response to providing the user prompt) and transmits the query to the search system 104. The search system 104 receives the search query from the user device 100 and generates search results in response to receiving (e.g., based on) the query. Specifically, the search system 104 generates the search results based on the search query and information included in one or more records stored in the search data store 110. In this example, each record may include or reference content related to any of native apps, native app states, websites (e.g., web pages), documents, and/or media (e.g., audio, video, and/or image) files. In some examples, the information included in the records may include one or more access mechanisms (AMs) that enable user devices 100 to access app states of native or web-based apps specified by the records. In general, the information included or referenced in each record may be referred to herein as result object data. The search system 104 transmits the result object data included in the records (e.g., one or more files, or AMs) to the user device 100 as the search results. The records may further include record information (e.g., text) and other information (e.g., record names/IDs associated with the records), which the search system 104 may use to identify the records in the search data store 110, as described herein. The search system 104 transmits the search results, including the result object data, to the user device 100. The user device 100 receives the search results from the search system 104. In some examples, the user device 100 (or, e.g., another computing device) may display the search results to the user as one or more user selectable links that include the result object data, as described herein. In other examples, the user device 100 (or, e.g., another computing device) may provide a text-to-speech or playback output for the search results to the user, as also described herein.

In this disclosure, an app may refer to computer software that causes a computing device (e.g., a user device 100) to perform a task. In some examples, an app may be referred to as a "program." Example apps include word processing apps, spreadsheet apps, messaging apps, media streaming apps, social networking apps, and games. Apps can be executed on a variety of different computing devices, including mobile computing devices such as smartphones, tablets, and wearable computing devices (e.g., headsets and/or watches). Apps can also be executed on other types of computing devices having other form factors, such as laptop computers, desktop computers, or other consumer electronic devices. In some examples, apps may be installed on a computing device prior to a user purchasing the device. In other examples, the user may download and install apps on the computing device after purchasing the device. A native app, as used herein, may refer to an app that is installed and executed on a user device 100. A web-based app may refer to an app that is accessible from a user device via a web browser app.

An AM, as used herein, may include any of a native app AM (hereinafter, "app AM," or "AAM"), a web AM (hereinafter, "WAM"), and an app download address (ADA). As such, a user device 100 of the present disclosure may use an AM to access the functionality provided by a native or a web-based app. For example, the user may select a user selectable link that includes the AM to access the functionality of the app. An AAM may be a string that references a native app and indicates one or more operations for a user device 100 (e.g., the app) to perform. If a user of the user device 100 selects a user selectable link that includes the AAM, the device 100 may launch the native app referenced by the AAM and (e.g., cause the app to) perform the operations indicated by the AAM. In other words, the user selecting the user selectable link may cause the user device 100 to launch the native app and set the app into a state (e.g., in which the app displays a GUI) corresponding to the operations. As a result, the native app may be configured to display one or more products, services, or vendors, to the user, e.g., via a display of the user device 100. In this manner, the AAM may specify the state of the native app. The state, in turn, may refer to the operations indicated by the AAM and/or the outcome of the native app performing the operations in response to the user selecting the user selectable link including the AAM. A WAM may include a resource identifier that references a web resource (e.g., a page of a web-based app, or web site). For example, the WAM may include a uniform resource locator (URL) (i.e., a web address) used with the hypertext transfer protocol (HTTP). If a user of a user device 100 selects a user selectable link that includes the WAM, the device 100 may launch a web browser app included on the device 100 and retrieve the web resource referenced by the resource identifier. Stated another way, if the user selects the user selectable link, the user device 100 may launch the web browser app and access a state (e.g., a page) of a web-based app, or website, specified by the WAM. In some examples, a WAM included in a record along with an AAM may specify a state of a web-based app that is equivalent (e.g., analogous) to a state of a native app specified by the AAM. An ADA may specify a location (e.g., a digital distribution platform, such as Google Play® by Google Inc.) where a native app (e.g., a native app referenced by an AAM) may be downloaded. In some examples, a record may include an ADA along with an AAM (and, e.g., a WAM). In these examples, the ADA may specify a location from which a native app referenced by the AAM may be downloaded.

In some examples, the search system 104 may transmit the search results, including the result object data, to the user device 100 with additional data. For example, the search system 104 may transmit link (e.g., text and/or image) data that the user device 100 may use to generate the user selectable links for the result object data included in the search results. Each user selectable link may include a portion of the link data that the user of the user device 100 may select (e.g., touch, or "click on"). Each user selectable link may also be associated with the corresponding result object data included in the search results, such that when the user selects the link, the user device 100 accesses the content (e.g., one or more files) specified by the data, or launches a native or web-based app referenced by the associated AM(s) and causes the app to perform one or more operations indicated by the AM(s). In some examples, the portion of the link data included in a particular user selectable link may indicate the content accessed or operations performed by the user device 100 in response to the user selecting the link.

As described herein, the search system 104 uses data included in (e.g., records stored in) the search data store 110 to generate search results based on search queries received from the user device 100. The search data store 110 may include one or more databases, indices (e.g., inverted indices), tables, files, or other data structures that may be used to implement the techniques of the present disclosure. In some examples, the search data store 110 may be included in one or more storage devices. The search data store 110 includes one or more records (e.g., as shown in FIG. 6). Each record may include data related to native apps, native app states, websites (e.g., web pages), documents, and/or media (e.g., audio, video, and/or image) files. For example, each record may include, among other content, a record name/identifier (ID), record information, and result object data, which are described in greater detail with reference to FIG. 6.

As described herein, the search system 104 receives the search query from the user device 100 and generates the search results based on the query. The search query may include text, numbers, and/or symbols (e.g., punctuation) entered into the user device 100 by the user via voice input. For example, the user may have entered the search query into the user device 100 via voice input using a search app included on the device 100. In some examples, the search app may be a native app dedicated to search. In other examples, the search app may be a more general app, such as a web browser app also included on the user device 100.

In some examples, the user device 100 may transmit additional data to the search system 104 along with the search query. The search query and the additional data may be referred to herein as a query wrapper. The additional data may include geo-location data associated with the user device 100, platform data for the device 100 (e.g., a type and/or a version of the device 100, an OS, and/or a web browser app of the device 100), an identity of the user (e.g., a username), partner specific data, and other data. The user device 100 may transmit the query wrapper to the search system 104. The search system 104 may use the search query and/or the additional data included in the query wrapper to generate the search results and transmit the results to the user device 100.

As described herein, to generate the search results, search module 108 may identify one or more records included in the search data store 110 based on the search query. Initially, the search module 108 may analyze the search query. The search module 108 may then identify one or more records included in the search data store 110 based on the (e.g., analyzed) search query. For example, the search module 108 may identify the records based on (e.g., text) matches between terms of the search query and terms of information included in the records. The search module 108 may then process (e.g., score) the identified records. For example, the search module 108 may determine how well the identified records match the search query. The search module 108 may then select one or more of the identified records that best match the search query. The search module 108 may transmit record names/IDs associated with the selected records to the result generation module 112. The result generation module 112 may identify the records selected by the search module 108 in the search data store 110 using the received record names/IDs. The result generation module 112 may then select result object data from the identified records. The result generation module 112 may transmit the selected result object data to the user device 100 as the search results.

In some examples, the result generation module 112 may transmit additional information with the result object data to the user device 100. For example, as described herein, a set processing module of the search module 108 may generate result scores for the records from which the result object data is selected (e.g., using values of metrics associated with persons, places, or things described in the records and/or various features of the search query). As such, the result object data selected from each record may be associated with a result score that indicates a rank of the data relative to result object data selected from other records. In these examples, the result generation module 112 may transmit the result scores associated with the result object data to the user device 100 with the data. In other examples, the result generation module 112 may transmit link (e.g., text and/or image) data associated with the result object data to the user device 100 to be used to display the data to the user, as also described herein.

The search system 104 may use various sources of data to generate and/or update the search data store 110. For example, the search system 104 may use the data sources to generate and/or update one or more databases, indices, tables, files, or other data structures included in the search data store 110. For instance, the search system 104 may generate new records and update existing records using data retrieved from the data sources. Although not shown, the search system 104 may include one or more modules configured to generate the new records and/or update the existing records. In some examples, some or all of the data included in the search data store 110 (e.g., one or more records) may be manually generated by a human operator.

The data sources may include a variety of different data providers. For example, the data sources may include providers (e.g., publishers) of websites (e.g., web pages), documents, and/or media (e.g., audio, video, and/or image) files. In some examples, the data sources may also include data from app developers, such as app developer websites and data feeds provided by app developers. The data sources may also include operators of digital distribution platforms configured to distribute apps to user devices 100. The data sources may further include other websites, such as websites that include web logs (i.e., blogs), app reviews, or other data related to apps. Additionally, the data sources may include social networking sites, such as "FACEBOOK®" by Facebook Inc. (e.g., Facebook posts) and "TWITTER®" by Twitter Inc. (e.g., text from tweets). The data sources may also include online databases that include data related to movies, television programs, music, and restaurants, and other types of data sources having various types of content and update rates. In some examples, the search system 104 may retrieve data from the data sources, including any type of data described herein. The search system 104 may then generate one or more records based on the data and store the records in the search data store 110. In other examples, some or all of the data included in the records (e.g., record information) may be manually generated by a human operator. In further examples, the data included in the records may be updated over time so that the search system 104 provides up-to-date search results in response to search queries received from the user device 100.

Figure 4:
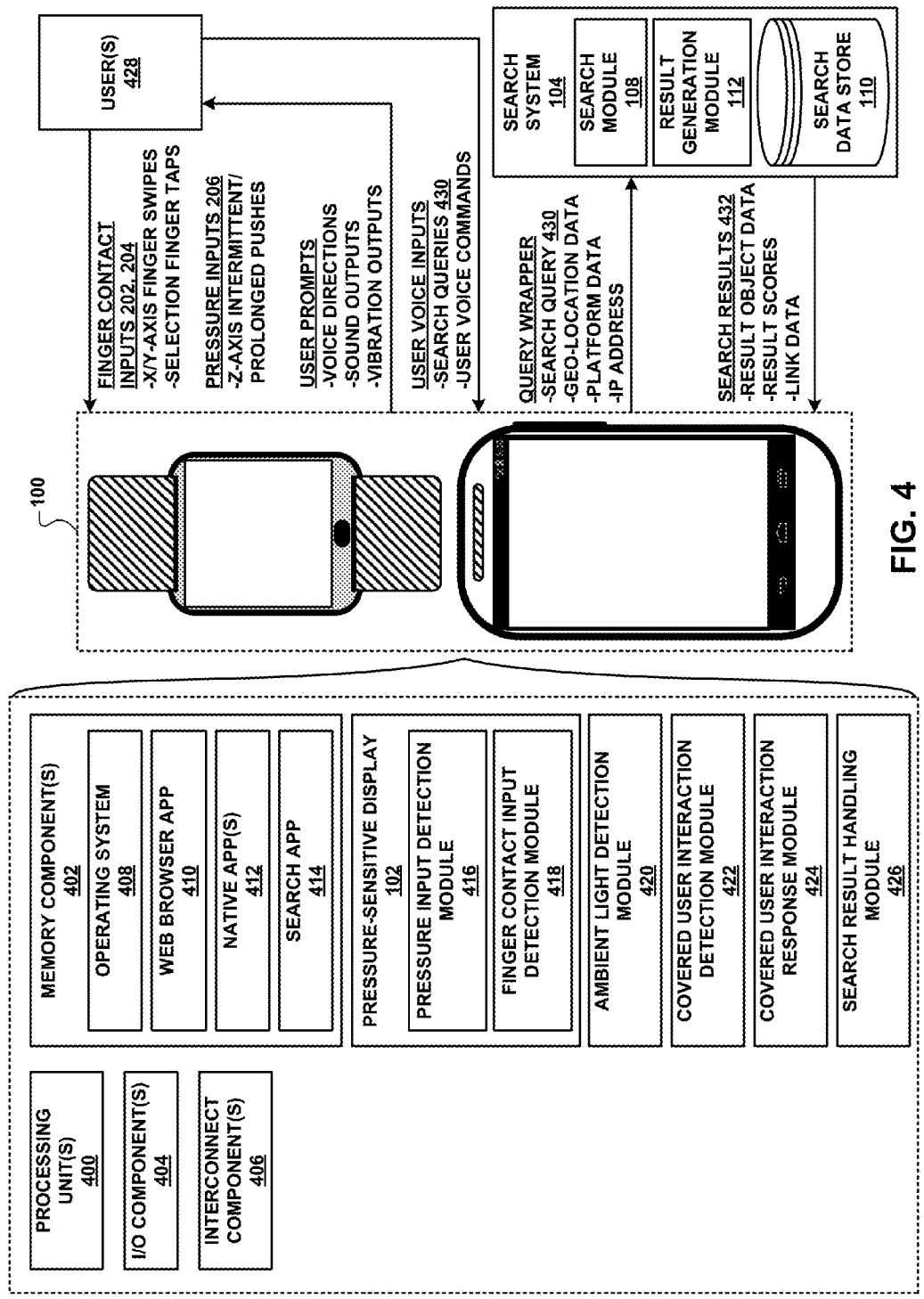
FIG. 4 is a functional block diagram of an example user device in communication with a user and a search system.

FIG. 4 is a functional block diagram of an example user device 100 in communication with one or more users 428 and/or a search system 104. As shown in FIG. 4, the user device 100 includes one or more processing units 400, memory components 402, input/output (I/O) components 404, and interconnect components 406. The memory component(s) 402 store an OS 408, a web browser app 410, one or more native apps 412 (e.g., native apps installed on the user device 100), and a search app 414. As also shown, the user device 100 further includes a pressure-sensitive display 102 including a pressure input detection module 416 and a finger contact input detection module 418, an ambient light detection module 420, a covered user interaction detection module 422, a covered user interaction response module 424, and a search result handling module 426. For example, the pressure-sensitive display 102 may correspond to any of a liquid crystal display (LCD), a plasma display, a cathode-ray display, and another display type included in the user device 100. The pressure input detection module 416 may correspond to any of a resistive touchscreen, a push-button-based touchscreen, and another pressure-sensitive sensor or input device and any associated hardware, firmware, and/or software included in the pressure-sensitive display 102. In some examples, the pressure input detection module 416 may correspond to a capacitive touchscreen configured to sense pressure inputs (e.g., via changes in distance and, as a result, capacitance between multiple membranes of the touchscreen due to pressure applied to the touchscreen) any associated hardware, firmware, and/or software included in the pressure-sensitive display 102. The finger contact input detection module 418 may correspond to any of a capacitive touchscreen and another finger contact-sensitive sensor or input device and any associated hardware, firmware, and/or software included in the pressure-sensitive display 102. The ambient light detection module 420 may correspond to any of an ambient light sensor, a video and/or still image camera, and another input device included in the user device 100 (e.g., in the presence-sensitive display 102) and configured to detect an amount of ambient light incident upon the device 100 (e.g., upon the display 102). The covered user interaction detection module 422, covered user interaction response module 424, and search result handling module 426 may each be implemented by the processing unit(s) 400 executing computer-readable instructions stored in the memory component(s) 402, causing the unit(s) 400 to interact with any of the resources described herein with reference to the user device 100, and/or with any of the user(s) 428, the search system 104, and other computing devices. As described herein, in some examples (not shown), the user device 100 may further include an accelerometer sensor configured to provide outputs that indicate pressure inputs received at (e.g., force applied to) the pressure-sensitive display 102.

The processing unit(s) 400 may be configured to execute instructions stored in the memory component(s) 402 and communicate with the memory component(s) 402 and I/O component(s) 404 (e.g., via the interconnect component(s) 406). Each of the OS 408, web browser app 410, native app(s) 412, and search app 414 may be embodied in computer-executable, or computer-readable, instructions and executed by the processing unit(s) 400. The memory component(s) 402 may further store computer-executable, or computer-readable, instructions associated with (e.g., used to operate) one or more of the pressure-sensitive display 102, pressure input detection module 416, finger contact input detection module 418, ambient light detection module 420, covered user interaction detection module 422, covered user interaction response module 424, and search result handling module 426, which may also be executed by the processing unit(s) 400. The memory component(s) 402 may also be configured to store system parameters and other data. Each of the I/O component(s) 404 may be configured to (e.g., at the direction of the processing unit(s) 400) receive inputs (e.g., pressure inputs 206, finger contact inputs 202, 204, search queries 430 as user voice inputs, and/or search results 432) to the user device 100 and transmit outputs (e.g., user prompts, search queries 430 as text strings, text-to-speech or playback outputs, and/or forwarded search results 432) from the device 100. The interconnect component(s) 404 (e.g., a bus) may be configured to provide communication between the processing unit(s) 400, memory component(s) 402, and I/O component(s) 404, as well as among other systems or devices included within the user device 100 and/or located outside of the device 100 (e.g., the search system 104 and/or other computing devices).

The units, components, and modules of the user device 100 depicted in FIG. 4 may enable the device 100 to perform the techniques attributed to the device 100 in this disclosure.

For example, the user device 100 (e.g., the processing unit(s) 400 executing instructions stored in the memory component(s) 402) may be configured to receive (e.g., via the I/O component(s) 404) pressure inputs 206 from the user(s) 428 at the pressure-sensitive display 102 and determine that the display 102 is covered. The user device 100 (e.g., the processing unit(s) 400 executing instructions stored in the memory component(s) 402) may be further configured to provide (e.g., via the I/O component(s) 404) user prompts to the user(s) 428 and receive (e.g., via the I/O component(s) 404 and search app 414) search queries 430 from the user(s) 428 via voice input. For example, the user device 100 may be configured to receive the search queries 430 from the user(s) 428 via a voice input module (not shown) configured to receive voice inputs from the user(s) 428 and convert them to one or more text strings via speech recognition techniques. The user device 100 (e.g., the processing unit(s) 400 executing instructions stored in the memory component(s) 402) may also be configured to transmit (e.g., via the I/O component(s) 404) the search queries 430 to the search system 104, receive (e.g., via the I/O component(s) 404) search results 432 from the system 104, and perform an action associated with the results 432.

The processing unit(s) 400 may execute one or more instructions included in the memory component(s) 402 to perform one or more of receiving the pressure inputs 206 from the user(s) 428, determining that the pressure-sensitive display 102 is covered, providing the user prompts to the user(s) 428, receiving the search queries 430 from the user(s) 428, transmitting the queries 430 to the search system 104, receiving the search results 432 from the system 104, and performing the action associated with the results 432. For example, the processing unit(s) 400 may execute instructions associated with one or more of the OS 408, web browser app 410, native app(s) 412, search app 414, pressure-sensitive display 102, pressure input detection module 416, finger contact input detection module 418, ambient light detection module 420, covered user interaction detection module 422, covered user interaction response module 424, and search result handling module 426. In a specific example, the processing unit(s) 400 may execute instructions that cause the user device 100 to run the OS 408. To receive the pressure inputs 206 from the user(s) 428, the processing unit(s) 400 may execute instructions that cause the user device 100 to operate the pressure input detection module 416 of the pressure-sensitive display 102. In additional examples, the user device 100 may be further configured to receive finger contact inputs 202, 204 from the user(s) 428, e.g., via the processing unit(s) 400 executing instructions that cause the device 100 to operate the finger contact input detection module 418. To determine that the pressure-sensitive display 102 is covered, the processing unit(s) 400 may execute instructions that cause the user device 100 to operate the covered user interaction detection module 422. As described herein, in some examples, to make this determination, the processing unit(s) 400 may execute instructions that cause the user device 100 to operate the ambient light detection module 420. To provide the user prompts to the user(s) 428, receive the search queries 430 from the user(s) 428 via voice input, transmit the queries 430 to the search system 104, and receive the search results 432 from the system 104, the processing unit(s) 400 may further execute instructions that cause the user device 100 to operate the covered user interaction response module 424 and run one or more of the web browser app 410, native app(s) 412, and search app 414, e.g., within the OS 408. For example, to provide the user prompts to the user(s) 428, the processing unit(s) 400 may execute instructions that cause the user device 100 to operate a sound and/or vibration output module (not shown). To receive the search queries 430 from the user(s) 428, transmit the queries 430 to the search system 104, and receive the search results 432 from the system 104, the processing unit(s) 400 may execute instructions that cause the user device 100 to run the search app 414, which may be an app dedicated to search, or any of the web browser app 410 and native app(s) 412 (e.g., a more general app).

To perform the action associated with the search results 432, the processing unit(s) 400 may execute instructions that cause the user device 100 to operate the search result handling module 426. As a result, as one example, the user device 100 may display the search results 432 to the user(s) 428 at the pressure-sensitive display 102. As another example, the user device 100 may provide text-to-speech or playback outputs for the search results 432 to the user(s) 428. As still another example, the user device 100 may forward the search results 432 (e.g., via any of a wireless and a wired communications network or protocol) to one or more (e.g., proximate) other computing devices, e.g., for display and/or text-to-speech or playback output.

FIG. 5A illustrates an example of the search system 104. As described herein, the search system 104 generates search results 432 based on a search query 430 received from the user device 100 and using data included in the search data store 110. Specifically, the search module 108 identifies one or more records included in the search data store 110 based on the search query 430. The search module 108 then transmits one or more record names/IDs 500 that identify the identified records to the result generation module 112. The result generation module 112 receives the record names/IDs 500 from the search module 108, identifies the records in the search data store 110 using the names/IDs 500, and selects result object data from the identified records. The result generation module 112 then transmits the selected result object data to the user device 100 as the search results 432 (e.g., with result scores, link data, and/or other data).

FIG. 5B illustrates examples of the search module 108 and search data store 110. The search module 108 of FIG. 5B includes a query analysis module 502, a consideration set generation module (hereinafter, "set generation module") 504, and a consideration set processing module (hereinafter, "set processing module") 506. The query analysis module 502 receives a search query 430 from the user device 100 (e.g., as part of a query wrapper) and analyzes the query 430 (e.g., performs any of tokenization, filtering, stemming, synonymization, and stop word removal with respect to the query 430). The set generation module 504 identifies one or more records included in the search data store 110 based on the (e.g., analyzed) search query 430 (e.g., using information retrieval software, such as Lucene® developed by the Apache Software Foundation). The set generation module 504 may identify the records based on one or more (e.g., text) matches between one or more terms of the search query 430 and one or more terms of information (e.g., record names/IDs and/or record information) included in the records. The identified records may be referred to herein as a "consideration set." The set processing module 506 may process (e.g., score and select a subset of) the consideration set, select one or more record names/IDs 500 from the records of the set that identify some or all of the records, and transmit the names/IDs 500 to the result generation module 112.

The information conveyed by the search results 432 may depend on the manner in which the set processing module 506 generates the result scores for the records. For example, for each record, the corresponding result score may indicate relevance of the information specified by the record to the search query 430, popularity of the information, or other properties of the information, depending on the one or more parameters the set processing module 506 uses to score the records. The set processing module 506 may generate the result scores for the records in a variety of different ways. In some examples, the set processing module 506 generates a result score for a record based on one or more scoring features. The scoring features may be associated with the record and/or the search query 430. A record scoring feature may be based on any data associated with a record. For example, a record scoring feature may be based on any data included in record information of a record. Example record scoring features may be a quality score, or whether the record includes an AAM that specifies a default app state (e.g., a main page of a native app), or a deeper app state. A query scoring feature may include any data associated with the search query 430. For example, a query scoring feature may include a number of words in the search query 430, popularity of the query 430, and an expected frequency of the words in the query 430. A record-query scoring feature may include any data generated based on information associated with both a record and the search query 430 that resulted in identification of the record by the set generation module 504. For example, record-query scoring features may include parameters that indicate how well terms of the search query 430 match terms of record information of the identified record. According to the disclosed techniques, the set processing module 506 may generate a result score for a record based on a record, query, record-query, and/or any additional scoring features not explicitly listed.

In some examples, the set processing module 506 may include one or more machine-learned models (e.g., a supervised learning model) configured to receive one or more scoring features. The machine-learned models may generate one or more result scores based on at least one of the record, query, and record-query scoring features described herein. For example, the set processing module 506 may pair the search query 430 with each record and calculate a vector of features for each (query, record) pair. The vector of features may include one or more record, query, and record-query scoring features. The set processing module 506 may then input the vector of features into a machine-learned relevance (MLR) model (e.g., including regression) to calculate a result score for the record. In some examples, the MLR model may include a set of decision trees (e.g., gradient-boosted decision trees), or may be trained by a simple form of logistic regression. In other examples, the machine-learned task described herein can be framed as a semi-supervised learning task, where a minority of the training data is labeled with human curated result scores and the rest of the data is used without such labels.

As described herein, the result scores associated with the records (e.g., the information included therein) may be used in a variety of different ways. In some examples, the result scores may be used to rank (e.g., order) the corresponding result object data within a list. In these examples, a higher result score may indicate that the corresponding result object data (e.g., information) is more relevant to the user (e.g., to the search query 430) than result object data having a smaller result score. In examples where the search results 432 are displayed as a list of user selectable links at the user device 100 or another computing device, the links including result object data associated with larger result scores may be listed closer to the top of the list (e.g., near the top of the screen). In these examples, the links including result object data having lower result scores may be located farther down the list (e.g., off screen) and may be accessed by scrolling down the screen of the user device 100 or other computing device.

FIG. 6 depicts an example record 600 that may be included in the search data store 110. The record 600 of FIG. 6 includes (e.g., specifies) information related to any of native apps, native app states, websites (e.g., web pages), documents, and/or media (e.g., audio, video, and/or image) files, as described herein. As shown in FIG. 6, the record 600 includes a record name/ID 602 that uniquely identifies the record 600 among other records 600 included in the search data store 110. As further shown, the record 600 also includes record information 604 (e.g., text) that describes the information, or content, included in (e.g., specified by) the record 600. As also shown, the record 600 further includes result object data 606 that corresponds to the information, or content, included in (e.g., specified by) the record 600. For example, as shown, the result object data 606 may include or indicate one or more files, including text, image, audio, and/or video data. As further shown, the result object data 606 may include one or more AMs (e.g., AAMs, WAMs, and/or ADAs) that enable a user device 100 to access app states of native or web-based apps, as described herein.

In some examples, the record 600 of FIG. 6 may also include information that describes values of one or more metrics associated with a person, place, or thing described in the record 600. Example metrics include the popularity of a place described in the record 600 and/or ratings (e.g., user ratings) of the place. For example, if the record 600 describes a song, a metric associated with the song may be based on the popularity of the song and/or ratings (e.g., user ratings) of the song. The information included in the record 600 may also be based on measurements associated with the record 600, such as how often the record is retrieved during a search and how often user selectable links for information specified by the record 600 are selected by a user. The information may also indicate whether the record 600 includes an AAM for a default app state, or a deeper app state, of a native app.

FIGS. 7A-7C are flow diagrams that illustrate example methods 700A-700C, respectively, for performing a search at a user device 100 in response to receiving a pressure input 206 at a pressure-sensitive display 102 of the device 100 and determining that the display 102 is covered. With reference to FIG. 7A, in block 702A, a user device 100 may initially receive a pressure input 206 from a user of the device 100 at a pressure-sensitive display 102 of the device 100. In block 704A, the user device 100 (e.g., the covered user interaction detection module 422) may determine that the pressure-sensitive display 102 is covered. As described herein, the user device 100 determining that the pressure-sensitive display 102 is covered may include the device 100 determining that the display 102 is obscured from the user's view by one or more layers of clothing (e.g., due to the device 100 being located under the user's sleeve or in the user's pocket) or by other objects. For example, the user device 100 may determine that the pressure-sensitive display 102 is covered before, during (e.g., in response to), and/or after receiving the pressure input 206 from the user. As one example, with reference to FIG. 7B, in block 702B, the user device 100 may determine that the pressure input 206 does not coincide with a finger contact input 202, 204 received substantially contemporaneously with the pressure input 206 from the user at (e.g., a capacitive touchscreen included in) the pressure-sensitive display 102 and, in block 704B, determine that the display 102 is covered based on this determination. Additionally (e.g., in combination with the determination described above), or alternatively, with reference to FIG. 7C, in block 702C, the user device 100 may receive an output from an ambient light sensor (or, e.g., a camera, or another input device) of the device 100. In this example, the output may indicate an amount of ambient light present at the pressure-sensitive display 102. In block 704C, the user device 100 may further determine that the pressure-sensitive display 102 is covered based on the output from the ambient light sensor (e.g., determine that the amount of ambient light present at the pressure-sensitive display 102, as indicated by the output, is below a threshold amount).

In block 706A, the user device 100 (e.g., the covered user interaction response module 424) may optionally, in response to receiving the pressure input 206 and determining that the pressure-sensitive display 102 is covered, provide a user prompt (e.g., a sound and/or vibration output) to the user. For example, the user prompt may be configured to prompt the user to provide a search query 430 to the user device 100 via voice input. In block 708A, the user device 100 (e.g., the covered user interaction response module 424) may, in response to receiving the pressure input 206 and determining that the pressure-sensitive display 102 is covered (and, e.g., in response to and subsequent to providing the user prompt), receive the search query 430 from the user via voice input. For example, the user device 100 may allow the user to provide the search query 430 via voice input within a predefined amount of time after the device 100 provides the user prompt to the user. In some examples, the user device 100 may receive the search query 430 from the user via the search app 414 included on the device 100.

In block 710A, the user device 100 (e.g., the covered user interaction response module 424) may transmit the search query 430 to the search system 104 via the network 106 (e.g., as part of a query wrapper). In this example, the search system 104 may receive the search query 430 from the user device 100 and generate one or more search results 432 based on the query 430. As described herein, the search results 432 may include result object data specifying content related to any of native apps, native app states, websites (e.g., web pages), documents, and/or media (e.g., audio, video, and/or image) files, as well as one or more result scores and link data. The search system 104 may then transmit the search results 432 to the user device 100. In block 712A, the user device 100 (e.g., the covered user interaction response module 424) may receive the search results 432, including the result object data and other information, from the search system 104 subsequent (e.g., in response) to transmitting the search query 430 to the system 104. In block 714A, the user device 100 (e.g., the search result handling module 426) may perform an action associated with the search results 432. As one example, the user device 100 may display one or more of the search results 432 to the user at the pressure-sensitive display 102. As another example, the user device 100 may provide a text-to-speech and/or playback output for one or more of the search results 432. As still another example, the user device 100 may forward one or more of the search results 432 to another computing device (e.g., for display or text-to-speech and/or playback output, in a similar manner as described herein).

Figure 8:
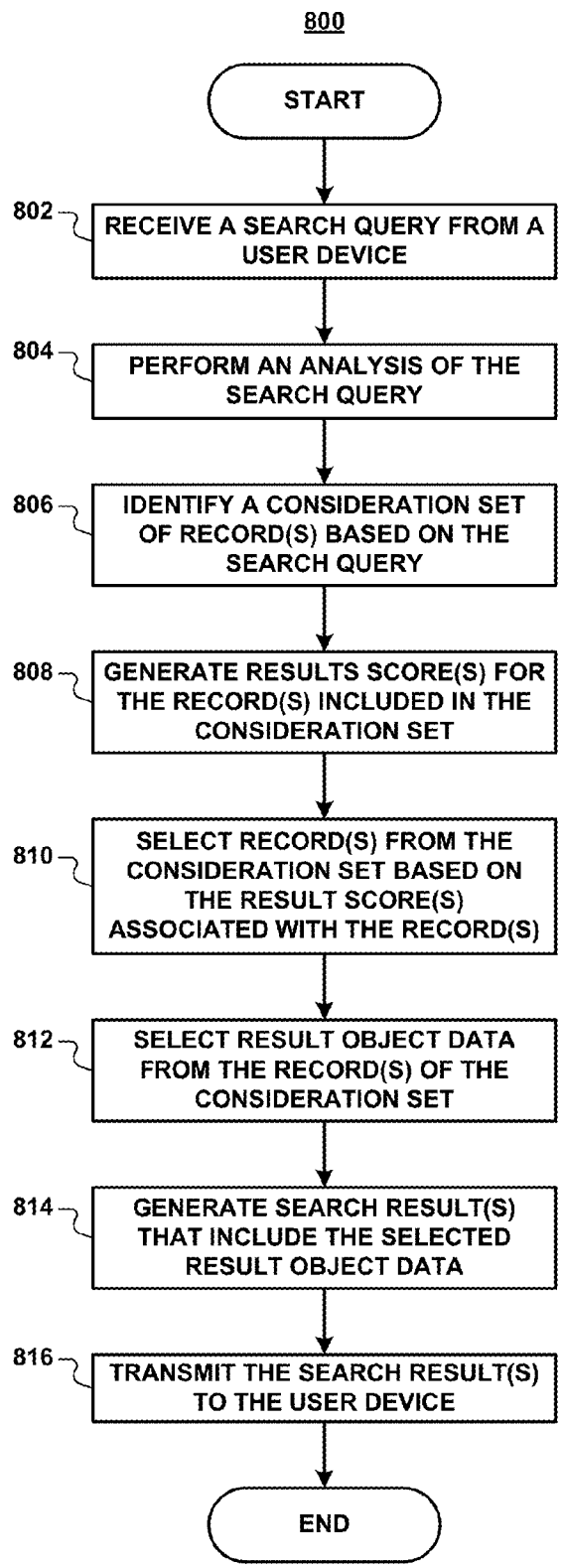
FIG. 8 is a flow diagram that illustrates an example method for performing a search for records using a search system based on a search query received from a user device.

FIG. 8 is a flow diagram that illustrates an example method 800 for performing a search for one or more records 600 included in the search data store 110 using a search query 430 received from a user device 100. As shown in FIG. 8, in block 802, the search system 104 may initially receive a search query 430 specified by a user from a user device 100 (e.g., as part of a query wrapper). As described with reference to FIG. 7A, the user device 100 may receive the search query 430 from the user and transmit the query 430 to the search system 104 upon receiving a pressure input 206 at a pressure-sensitive display 102 of the device 100 and determining that the display 102 is covered. In some examples, the search system 104 may also receive other information from the user device 100 (e.g., as part of the query wrapper, or separately), such as information associated with the user and/or geo-location, platform, and IP address information associated with the device 100. In block 804, the search system 104 (e.g., the query analysis module 502) may optionally perform an analysis of the search query 430 (e.g., perform any of tokenization, filtering, stemming, synonymization, and stop word removal with respect to the query 430). In block 806, the search system 104 (e.g., the set generation module 504) may identify a consideration set of one or more records 600 included in the search data store 110 based on the (e.g., analyzed) search query 430. In this example, each identified record 600 may specify any of a variety of information, including content related to native apps, native app states, websites (e.g., web pages), documents, and/or media (e.g., audio, video, and/or image) files. Also in this example, the search system 104 (e.g., the set generation module 504) may identify the records 600 based on one or more matches between one or more terms of the search query 430 and one or more terms of information (e.g., record names/IDs 602 and/or record information 604) included in the records 600.

In blocks 808-810, the search system 104 (e.g., the set processing module 506) may optionally process the consideration set of records 600. Specifically, in block 808, the search system 104 may generate one or more result scores for the records 600 included in the consideration set. For example, the search system 104 may generate a result score for each record 600 included in the consideration set. In block 810, the search system 104 may select one or more (e.g., a subset of the) records 600 from the consideration set based on the one or more result scores associated with the selected records 600. For example, the search system 104 may select one or more records 600 having the highest (e.g., largest) one or more result scores. In block 812, the search system 104 (e.g., the result generation module 112) may select result object data from the (e.g., selected) records 600 of the consideration set. For example, the search system 104 may select information relating to any of native apps, native app states, websites, documents, and/or media files from each (e.g., selected) record 600. In some examples, the search system 104 may also select other information from the (e.g., selected) records 600, such as result scores and/or link data associated with the records 600. In block 814, the search system 104 (e.g., the result generation module 112) may generate one or more search results 432 that include the selected result object data. For example, the search system 104 may generate the search results 432 such that each result 432 includes the result object data selected from one of the (e.g., selected) records 600 of the consideration set. In block 816, the search system 104 (e.g., the result generation module 112) may transmit the search results 432, including the selected result object data and any other information, to the user device 100.

FIGS. 9A-10B illustrate example GUIs that may be generated on a user device 100 and other computing devices according to this disclosure. The user device 100 shown in FIGS. 9A-10A is a wrist watch computing device (e.g., a smart watch) including watch straps. Example wrist watch computing devices include the SAMSUNG GALAXY GEAR®, the SAMSUNG GALAXY GEAR® 2, the SAMSUNG GEAR® 2 Neo, and the SAMSUNG GEAR FIT® developed by Samsung Electronics Co., Ltd., as well as the APPLE WATCH® developed by Apple Inc. FIG. 10B depicts another computing device 1000 (e.g., a smartphone). As described herein, the user device 100 includes a pressure-sensitive display 102 configured to receive pressure inputs 206 from users of the device 100. As also described herein, the pressure-sensitive display 102 may also be (e.g., may include a capacitive touchscreen) configured to receive finger contact inputs 202, 204 (e.g., finger taps and/or swipes) from the users.

Figure 9C:
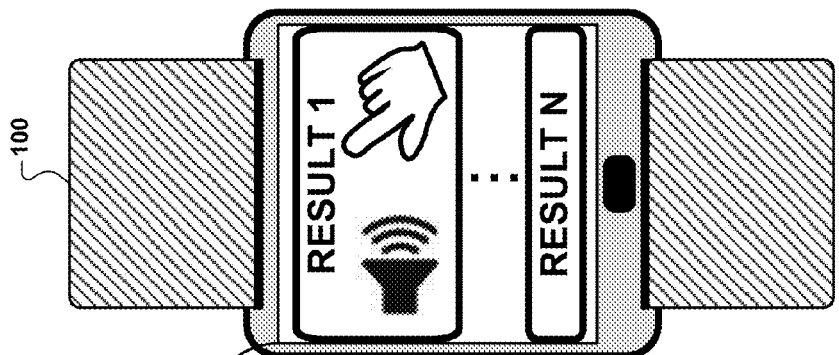
Figure 9B:
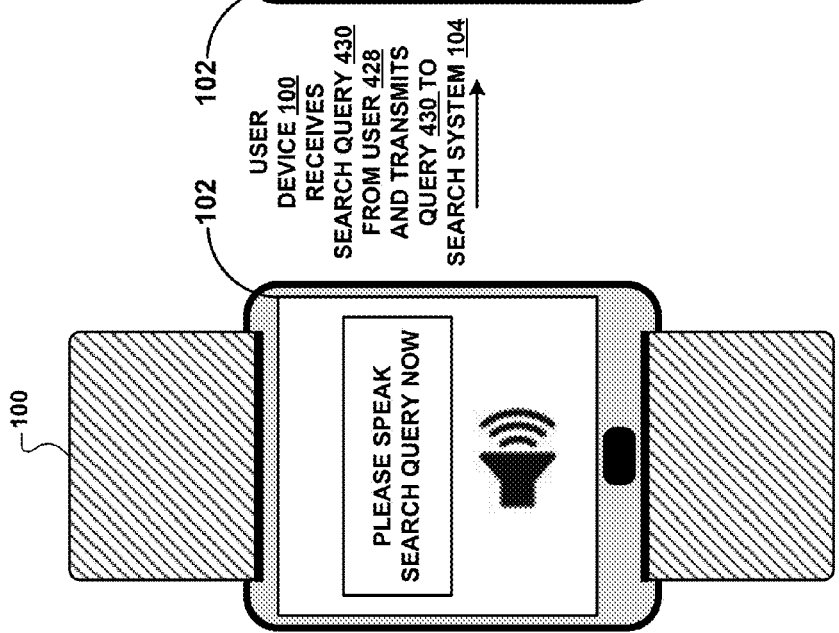
Figure 9A:
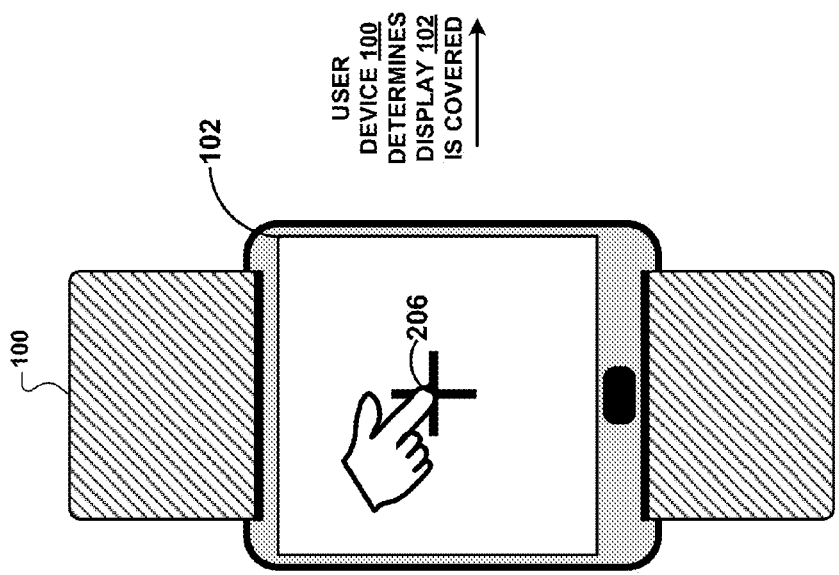

As shown in FIG. 9A, the user device 100 receives a pressure input 206 from a user of the device 100 at the pressure-sensitive display 102. Upon receiving the pressure input 206, the user device 100 further determines that the pressure-sensitive display 102 is covered. As one example, as described herein, the user device 100 may determine that the pressure input 206 does not coincide with any finger contact inputs 202, 204 received substantially contemporaneously with the pressure input 206 at (e.g., the capacitive touchscreen included in) the pressure-sensitive display 102. As another example, as also described herein, the user device 100 may receive an output from an ambient light sensor included in the device 100 and determine that the pressure-sensitive display 102 is covered based on the received output (e.g., based on an amount of ambient light present at the display 102, as indicated by the output, such as an amount that is below a threshold amount). As previously explained, in some examples, the user device 100 may determine that the pressure-sensitive display 102 is covered prior to, during (e.g., in response to), or following receiving the pressure input 206.

As shown in FIG. 9B, upon receiving the pressure input 206 and determining that the pressure-sensitive display 102 is covered, the user device 100 may optionally provide a user prompt to the user. For example, as also shown, the user prompt may be configured to request that the user provide a search query 430 to the user device 100 via voice input. For instance, the user prompt may include one or more of a vibration, a tone, a soundbite, and a voice command output prompting the user to provide the search query 430 to the user device 100 via voice input (e.g., as indicated by the speaker GUI element shown in FIG. 9B). In this example, upon receiving the pressure input 206 and determining that the pressure-sensitive display 102 is covered (and, e.g., in response to the user prompt), the user device 100 receives the search query 430 from the user and transmits the query 430 to a search system 104.

As shown in FIG. 9C, the user device 100 receives one or more search results 432 from the search system 104 subsequent to transmitting the search query 430 and performs an action associated with the results 432. As one example, as also shown, the user device 100 displays the search results 432 to the user (e.g., as results 1-N, where N is an integer value greater or equal to 1) on the pressure-sensitive display 102. Additionally, or alternatively, as also shown, the user device 100 provides a text-to-speech and/or playback output for the search results 432 to the user (e.g., as indicated by the speaker GUI element shown in FIG. 9C). In still other examples, as shown in FIGS. 10A-10B, the user device 100 may forward the search results 432 for display or text-to-speech and/or playback output to the other computing device 1000.

The modules and data stores included in the user device 100 and search system 104 represent features that may be included in these devices and systems as they are described in the present disclosure. For example, the processing unit(s) 400, memory component(s) 402, I/O component(s) 404, interconnect component(s) 406, pressure-sensitive display 102, ambient light detection module 420, covered user interaction detection module 422, covered user interaction response module 424, search result handling module 426, and the various contents thereof may represent features included in the user device 100. Similarly, the search module 108, search data store 110, result generation module 112, and the various contents thereof may represent features included in the search system 104. The modules and data stores described herein may be embodied by electronic hardware, software, and/or firmware components. Depiction of different features as separate modules and data stores does not necessarily imply whether the modules and data stores are embodied by common or separate electronic hardware, software, and/or firmware components. As such, in some implementations, the features associated with the one or more modules and data stores depicted herein may be realized by common or separate electronic hardware, software, and/or firmware components.

The modules and data stores may be embodied by electronic hardware, software, and/or firmware components, including one or more processing units, memory components, I/O components, and interconnect components. The interconnect components may be configured to provide communication between the processing units, memory components, and I/O components. For example, the interconnect components may include one or more buses configured to transfer data between electronic components. The interconnect components may also include control circuits (e.g., a memory controller and/or an I/O controller) configured to control communication between electronic components.

The processing units may include one or more central processing units (CPUs), graphics processing units (GPUs), digital signal processing units (DSPs), or other processing units. The processing units may be configured to communicate with the memory components and I/O components. For example, the processing units may be configured to communicate with the memory components and I/O components via the interconnect components.

A memory component (memory) may include any volatile or non-volatile media. For example, the memory may include electrical media, magnetic media, and/or optical media, such as a random access memory (RAM), read-only memory (ROM), non-volatile RAM (NVRAM), electrically-erasable programmable ROM (EEPROM), Flash memory, hard disk drives (HDDs), solid state drives (SSDs), magnetic tape drives, optical storage technology (e.g., compact disc, digital versatile disc, and/or Blu-ray disc), or any other memory components. The memory components may include (e.g., store) the data described herein. For example, the memory components may include data used by the user device 100, data included in the record(s) 600 of the search data store 110, and/or other data. The memory components may also include instructions executed by the processing units. For example, the memory components may include computer-readable instructions that, when executed by the processing units, cause the units to perform the various functions attributed to the modules and data stores described herein.

The I/O components may refer to electronic hardware, software, and/or firmware providing communication with a variety of different devices. For example, the I/O components may provide communication between other devices and the processing units and memory components. In some examples, the I/O components may be configured to communicate with a computer network. For example, the I/O components may be configured to exchange data over a computer network using a variety of different physical connections, wireless connections, and protocols. The I/O components may include network interface components (e.g., a network interface controller), repeaters, network bridges, network switches, routers, and firewalls. In some examples, the I/O components may include hardware, software, and/or firmware configured to communicate with various human interface devices, including (e.g., pressure-sensitive) display screens, keyboards, pointer devices (e.g., a mouse), (e.g., capacitive, resistive, push-button-based, and/or other) touchscreens, speakers, and microphones. In some examples, the I/O components may include hardware, software, and/or firmware configured to communicate with additional devices, such as external memory (e.g., external HDDs).

In some implementations, the search system 104 may be a system of one or more computing devices (e.g., a computer search system) configured to implement the techniques described herein. Put another way, the features attributed to the modules and data stores described herein may be implemented by one or more computing devices. Each computing device may include any combination of the electronic hardware, software, and/or firmware described herein. For example, each computing device may include any combination of the processing units, memory components, I/O components, and interconnect components described herein. The computing devices may also include various human interface devices, including display screens, keyboards, pointing devices (e.g., a mouse), touchscreens, speakers, and microphones. The computing devices may also be configured to communicate with additional devices, such as external memory (e.g., external HDDs).

The computing devices of the search system 104 may be configured to communicate with the network 106. The computing devices may also be configured to communicate with one another via a computer network. In some examples, the computing devices may include one or more server computing devices configured to communicate with the user device 100 (e.g., receive search queries 430 and transmit search results 432), gather data from data sources, index the data, store the data, and store other documents or media. In some examples, the computing devices may reside within one or more machines at a single geographic location. In other examples, the computing devices may be distributed across a number of geographic locations.

What is claimed is:

1. A computing device comprising:
   a pressure-sensitive display configured to receive contact inputs from a user of the computing device and pressure inputs,
      wherein each pressure input of the pressure inputs is indicative of at least a predetermined pressure being applied to the pressure-sensitive display, and
      wherein each contact input of the contact inputs is indicative of direct contact of an electrically conductive object with the pressure-sensitive display;
   a network interface component configured to communicate with a network;
   one or more memory components configured to store computer-readable instructions; and
   one or more processing units configured to execute the computer-readable instructions, wherein the computer-readable instructions include:

in response to receiving a first pressure input of the pressure inputs from the user at the pressure-sensitive display, determining that the first pressure input corresponds to the pressure-sensitive display being covered in response to none of the contact inputs being received when the first pressure input is received;

in response to determining that the first pressure input corresponds to the pressure-sensitive display being covered, transmitting a search query to a search system via the network using the network interface component;

receiving search results from the search system in response to transmitting the search query; and performing an action associated with the search results.

2. The computing device of claim 1, wherein the computer-readable instructions further include, in response to determining that the first pressure input corresponds to the pressure-sensitive display being covered, providing a user prompt to the user, wherein the user prompt comprises one or more of a sound output and a vibration output.

3. The computing device of claim 1, wherein the pressure-sensitive display includes a capacitive touchscreen configured to receive the contact inputs from the user.

4. The computing device of claim 1, further comprising:
an ambient light sensor configured to transmit an output indicating an amount of ambient light incident on the pressure-sensitive display,
wherein the computer-readable instructions include:
receiving the output from the ambient light sensor, and
determining that the pressure-sensitive display is covered in response to the output indicating the ambient light is below a threshold.

5. The computing device of claim 1, wherein the computer-readable instructions include displaying the search results to the user at the pressure-sensitive display.

6. The computing device of claim 1, wherein the computer-readable instructions include playing the search results to the user using text-to-speech.

7. The computing device of claim 1, wherein the computer-readable instructions include forwarding the search results to another computing device.

8. The computing device of claim 1, further comprising:
an accelerometer sensor configured to transmit an output indicating an amount of force applied to the computing device by the user,
wherein the computer-readable instructions include receiving at least some of the pressure inputs based on the output from the accelerometer sensor.

9. The computing device of claim 1, wherein the computing device comprises one or more of a smartphone computing device, a smart watch computing device, and a fitness band computing device.

10. A method comprising:
selectively receiving pressure inputs via a pressure-sensitive display of a user device, wherein each pressure input of the pressure inputs is indicative of at least a predetermined pressure being applied to the pressure-sensitive display;
selectively receiving contact inputs from a user of the user device via the pressure-sensitive display, wherein each contact input of the contact inputs is indicative of direct contact of an electrically conductive object with the pressure-sensitive display;
in response to receiving a first pressure input of the pressure inputs at the pressure-sensitive display, determining, by the user device, that the first pressure input corresponds to the pressure-sensitive display being covered in response to none of the contact inputs being received when the first pressure input is received;
in response to determining that the first pressure input corresponds to the pressure-sensitive display being covered, transmitting, from the user device, a search query to a search system via a network;
at the user device, receiving search results from the search system in response to transmitting the search query; and
by the user device, performing an action associated with the search results using the user device.

11. The method of claim 10, further comprising, in response to determining that the first pressure input corresponds to the pressure-sensitive display being covered, providing a user prompt from the user device to the user, wherein the user prompt includes one or more of a sound output and a vibration output.

12. The method of claim 10, wherein determining that the pressure-sensitive display is covered comprises:
receiving an output from an ambient light sensor of the user device, wherein the output indicates an amount of ambient light incident on the pressure-sensitive display; and
determining that the pressure-sensitive display is covered further based on the output being below a threshold.

13. The method of claim 10, wherein the action associated with the search results includes displaying the search results to the user on the pressure-sensitive display.

14. The method of claim 10, wherein receiving the one of the pressure inputs at the pressure-sensitive display comprises:
receiving an output from an accelerometer sensor of the user device, wherein the output indicates an amount of force applied to the user device by the user; and
receiving at least some of the pressure inputs based on the output from the accelerometer sensor.

15. A non-transitory computer-readable medium comprising instructions for execution by one or more processing units of a user device, wherein the instructions include:
selectively receiving pressure inputs via a pressure-sensitive display of the user device, wherein each pressure input of the pressure inputs is indicative of at least a predetermined pressure being applied to the pressure-sensitive display;
selectively receiving contact inputs from a user of the user device via the pressure-sensitive display, wherein each contact input of the contact inputs is indicative of direct contact of an electrically conductive object with the pressure-sensitive display;
in response to receiving a first pressure input of the pressure inputs at the pressure-sensitive display, determining that the first pressure input corresponds to the pressure-sensitive display being covered in response to none of the contact inputs being received when the first pressure input is received;
in response to determining that the first pressure input corresponds to the pressure-sensitive display being covered, transmitting a search query to a search system via a network;
receiving search results from the search system in response to transmitting the search query; and
performing an action associated with the search results using the user device.

16. The computer-readable medium of claim 15, wherein the instructions include receiving the search query via voice input from the user subsequent to providing the user prompt.

17. The computing device of claim 2, wherein the computer-readable instructions further include receiving the search query via voice input from the user subsequent to providing the user prompt.

18. The method of claim 11, further comprising receiving the search query via voice input from the user subsequent to providing the user prompt.

19. The method of claim 10, wherein the action associated with the search results includes audibly reading the search results to the user using text-to-speech.

20. The method of claim 10, wherein the action associated with the search results includes forwarding the search results to another computing device.

* * * * *